March 7, 1967 S. H. KAPLAN 3,308,326
COLOR IMAGE REPRODUCER HAVING RED PHOSPHOR COMBINED
WITH RED-PASS FILTER ELEMENT
Original Filed June 5, 1962

INVENTOR.
Sam H. Kaplan
BY Francis W. Crotty
Atty.

United States Patent Office 3,308,326
Patented Mar. 7, 1967

3,308,326
COLOR IMAGE REPRODUCER HAVING RED PHOSPHOR COMBINED WITH RED-PASS FILTER ELEMENT
Sam H. Kaplan, Chicago, Ill., assignor to Zenith Radio Corporation, Chicago, Ill., a corporation of Delaware
Continuation of application Ser. No. 412,595, Nov. 16, 1964, which is a continuation of application Ser. No. 200,230, June 5, 1962. This application May 19, 1966, Ser. No. 551,470
7 Claims. (Cl. 313—92)

This is a continuation of an application of Sam H. Kaplan, Serial No. 412,595 filed November 16, 1964 which is a continuation of Serial No. 200,230, filed June 5, 1962, now abandoned, which in turn is a continuation-in-part of an application of Sam H. Kaplan, Serial No. 812,416, filed on May 11, 1959, now Patent No. 3,114,065 granted December 10, 1963.

The invention relates, in general, to image reproducers for a color television system and is more specifically concerned with an improvement in that portion of the screen structure that contributes the red color component of the reproduced image.

In the fabrication of color television image reproducers difficulty has been experienced with the composition of that portion of the screen which contributes the red component of an image reproduced in simulated natural color. It has been the practice in the past to utilize a manganese activated zinc phosphate as the red phosphor even though it has been known that silver activated zinc cadmium sulfide yields a brighter red.

It is also known that the luminous efficiency of red phosphors prepared from the zinc cadmium sulfide family by varying the cadmium content is a sharply inverse function of the redness obtained, that is to say, increasing the cadmium content improves the color of red by having it less orange but by the same token the luminous output of the phosphor decreases rapidly. Efforts that have been made to date directed to the use of zinc cadmium sulfide for the red phosphor have resulted in a phosphor for which the wavelength of peak output is approximately 6850 Angstroms which is to be compared with the predecessor zinc phosphate compositions of equivalent color but for which the peak output occurs at a wavelength of approximately 6350 Angstroms. From the standpoint of luminous efficiency, the cadmium sulfide red with a peak output occurring at 6350 Angstroms would be much brighter than the phosphate red that peaks at the same position in the wavelength spectrum but this preferred response of the cadmium sulfide phosphor has not been available heretofore for the reason that the spectral emission of the cadmium sulfide red is very broad compared with that of the phosphate red. It is found that the spectral range of the cadmium sulfide red includes a portion which extends from the reference wavelength of 6350 Angstroms into the short wavelength region and it has been determined that this broad short wavelength portion, customarily referred to as a "tail" of the emission characteristic, has a very great influence on the color coordinates of the phosphor. It is for this reason that the gain in light output that might be expected from the use of cadmium sulfide red phosphors has not been realizable heretofore. It has been necessary to compromise the cadmium content to the end that the peak output of the phosphor occurs higher than the reference value of 6350 Angstroms in order to attain the desired red color. With the spectral response peaked at this higher wavelength, a significant amount of the radiated energy occurs in the infra-red region and, so far as the image reproducing capabilities of a target embodying the phosphor are concerned, this energy is lost as it can not be seen which, of course, detracts from the effective phosphor efficiency.

Accordingly, it is a principal object of the invention to improve the red component of the image screen of a tri-color cathode-ray image reproducer in a color television system.

A more particular object of the invention is to provide a tri-color cathode-ray tube comprising a screen including a new and improved phosphor composition for contributing the red color component to the simulated color image of a color television system.

Another particular object of the invention is to provide a tri-color cathode-ray tube comprising a screen including a phosphor which contributes the red color component to the simulated color image in a color television system and which is characterized by substantially increased luminous output.

Another specific object of the invention is to provide a tri-color cathode-ray tube comprising a screen including a phosphor for contributing the red color component to the color image of a color television system which effectively increases the contrast of a reproduced image without impairing its brightness.

A tri-color cathode-ray tube for producing an image in simulated natural color, and embodying the invention, comprises an image screen including a phosphor composition which comprises a phosphor material having a desired radiation in response to energization by electrons in the red portion of the visible spectrum within the range of 6000 to 7000 Angstroms with a peak output occurring at approximately 6300 Angstroms. The phosphor further has an undesired radiation extending from approximately 6000 Angstroms into the shorter wavelength region. The screen further includes a filter material which is absorptive of radiations having a wavelength extending into the shorter wavelength region from approximately 6000 Angstroms, which is transmissive of radiations within the range from 6000 to 7000 Angstroms, and which has a low reflectance at wavelengths of light corresponding to those of the target elements in the image screen which emit blue and green colors in order to enhance the image contrast-ambient light characteristic of the image screen.

In one aspect of the invention, the phosphor composition which contributes the red component to a color image is a composition of a cadmium sulfide phosphor which has a peak output or response occurring at a wavelength of approximately 6350 Angstroms. It is found that such a phosphor will also manifest a significant radiation in the shorter wavelength extending, for example, between approximately 5000 to 6000 Angstroms. An inorganic colored pigment is incorporated into the phosphor composition to absorb the radiation up to wavelengths not appreciably longer than 6000 Angstroms. This, in effect, eliminates the short wavelength tail characteristic of the emission spectrum of cadmium sulfide phosphor compositions to permit obtaining the desired color with the greater efficiency of luminous output of which such phosphors are capable by minimizing the influence of the tail portion on chromaticity.

The features of the present invention which are believed to be novel are set forth with particularity in the appended claims. The manner and organization of operation of the invention, together with further objects and advantages thereof, may be understood by reference to the following description taken in connection with the accompanying drawing, in the several figures of which like reference numerals identify like elements and in which:

Figure 1:
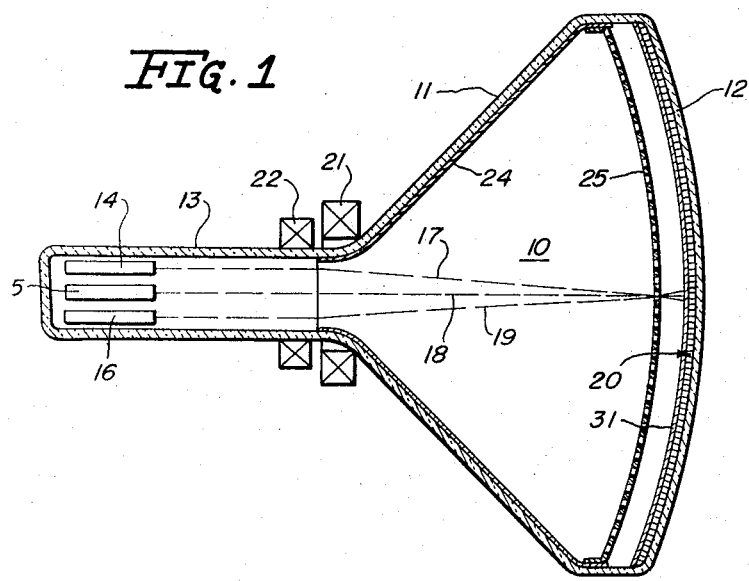
FIGURE 1 is a cross-sectional view, partly schematic, of a color television image reproducer including a preferred embodiment of a multi-color target structure embodying the present invention.

Referring now more particularly to FIGURE 1, the color television image reproducer 10 there represented is generally conventional in construction and comprises an envelope 11 having at one end an enlarged transparent faceplate section 12 and the usual neck section 13 at the opposite end. Three electron guns 14, 15 and 16 are positioned within neck section 13 to project three individual electron beams 17, 18 and 19 toward the internal surface of faceplate 12. Image reproducer 10 is provided with the customary deflection-control system comprising a deflection yoke 21 and may also include a convergence system represented in the drawing by a convergence coil 22 for converging electron beams 17–19 in the region immediately adjacent faceplate 12. A multi-color luminescent target structure 20 is supported upon faceplate 12 and is utilized to develop an image in a plurality of primary colors in response to controlled electron bombardment by beams 17–19. The construction of the color target is considered in more detail hereinafter in connection with FIGURES 2 and 3. The internal surface of envelope 11 adjacent target 20 is provided with a conductive coating 24 extending back into neck section 13 of the envelope. Conductive coat- 24 may comprise the usual metallic coating, preferably formed of aluminum, or may constitute a coating of collodial graphite or other conductive material. Imagine reproducer 10 further includes a color selection barrier 25 which may be of the conventional parallax type. If preferred, a deflection type color selection barrier may be utilized as element 25 in the image reproducer.

Image reproducer 10, except for particulars of its target which will be made clear hereinafter, is entirely conventional in construction and operation so that a detailed review thereof is not necessary. Briefly, electron beams 17–19 developed by guns 14–16 are utilized to selectively excite different portions of target 20 to produce an image of simulated natural color visible through transparent faceplate 12. Color selection may be achieved by any of the several known techniques, as noted above, including the use of an accelerating electric field between target 20 and color selection barrier 25 to achieve increased brightness by the known technique of post-deflection-acceleration. The three electron guns may be replaced by other well known excitation arrangements, such as a single element gun provided with a deflection system to deflect the beam produced by the gun selectively to three different points of apparent origin.

Figure 2:
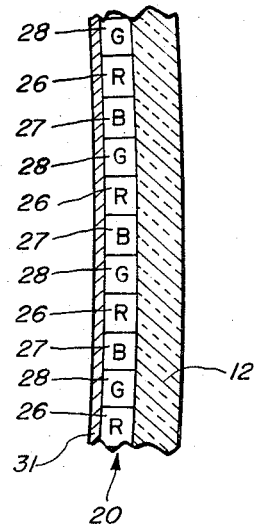
FIGURE 2 is an enlarged cross-sectional view of a portion of the target of the image reproduced in FIGURE 1.
Figure 3:
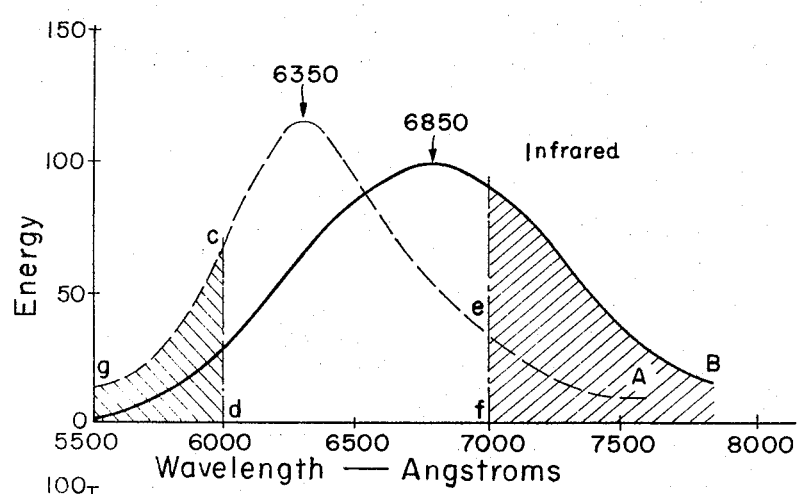
FIGURES 3 and 4 comprise graphs used in explaining certain characteristics of the red phosphor component of a color television image reproducer.

As illustrated in the sectional view of FIGURE 2, luminescent target 20 comprises a first color target group including a multiplicity of first target elements 26 distributed in a predetermined patttern upon the internal surface of faceplate 12. In most color image reproducers, the pattern of color target elements extends throughout the area of the faceplate although it may be restricted to any other pre-selected image screen area on the faceplate surface. The color target elements may comprise minute dots, or may comprise extremely narrow bands extending across the faceplate surface. Each of target elements 26 comprises a luminescent phosphor material and a color filter material which exhibits a high transmission efficiency for light in a predetermined spectral range including only one of the primary colors in which the image is to be reproduced. The color filter material also exhibits a low transmission efficiency for light in the remainder of the visible spectrum. For present purposes target elements 26 may be considered as the phosphor arrangement for contributing the red color component to the simulated color image of a color television system and the details of its phosphor and filter materials will be particularized hereinafter.

Target structure 20 further includes a second group of color target elements 27 which are interspersed throughout image screen area with target element group 26. Each of the target elements of the second group comprises a similar combination of luminescent materials selected to filter material with the constituent materials selected to emit and selectively transmit light of a second one of the primary colors used in reproducing an image on the target structure. For convenience target group 27 may be considered to emit blue light in response to excitation by impinging electrons.

The tri-color target 20 also includes a third group of target elements 28 which are essentially similar in structure to target elements 26 and 27. In this case, however, elements 28 are chosen to emit and transmit light corresponding to the third or green primary color used in reproducing an image on the target. In short, the multicolor target with its groups of elements 26–28 is arranged for selective energization by associated ones of the electron beams 17–19. This is accomplished in a popular form of target structure by arranging one element of each from the three groups of elements to form a triad with the triads distributed over faceplate 12 so that any of the beams admitted by color selection barrier 25 to the screen area is able to impinge upon and excite only the color target elements to which a particular beam has been assigned.

Preferably, an electron-transparent aluminum or other conductive film 31 covers the entire rear surface of target structure 20 to provide a convenient means for maintaining the target structure at a desired operating potential and to reflect light emitted from the groups of luminescent target elements 26–28 toward faceplate 12. As indicated above, the target structure may be supported on a transparent substrate mounted within envelope 11 of tube 10 if desired, although it is preferred that the target structure be deposited directly on the tube faceplate.

The general purpose of including filter material with each of the color target elements is explained in Kaplan Patent 3,114,065 and, since the present disclosure concerns most particularly the characteristics of the red phosphor target elements, the remainder of this disclosure will be confined to that single group of target elements.

In practicing the invention, red target elements 26 are formed of a phosphor material having a desired radiation in response to energization by electrons within the range from 6000 to 7000 Angstroms but also characterized by an undesired radiation extending from 6000 Angstroms into the shorter wavelength region. More specifically, it is preferred that the prosphor material exhibit an emission spectrum represented by curve A of FIGURE 3 with a peak response occurring at approximately 6350 Angstroms and arranged to have the following color coordinates: $x=0.64$ and $y=0.34$, since this is a satisfactory red color for use in the reproduction of television images in simulated natural color. The phosphor composition has two essential components; a luminescent phosphor and a filter material which attribute to the composition the desired effective spectral emission.

The luminescent phosphor material should preferably be a compound in which the metal ingredient is selected from the group comprising zinc and cadmium, in which the non-metallic ingredient is selected from the group comprising sulphides, selenides and tellurides, and activated by a metal selected from a group comprising silver, copper and the like. It is also possible to utilize a phosphor material of the manganese activated cadmium borate type. A particularly attractive phosphor material is silver activated zinc cadmium sulfide which has a spectral emission characteristic similar to that of curve A in FIGURE 3. It is known that the wavelength of peak response may be determined by the cadmium content which is selected to provide a peak response at approximately 6350 Angstroms. It is apparent that the emission in the infra-red region is quite small contrasted with the desired radiation within the 6000–7000 Angstrom range but the undesired tail portion of the characteristic is also pronounced, being identified by the shaded area c–d–g.

The present invention contemplates that the filter ingredient of the red phosphor will effectively eliminate the undesired radiation by exhibiting a maximum attenation or minimum transmissivity for radiation below the wavelength of 6000 Angstroms. If this is not accomplished, the tail portion c–d–g will have a marked effect on the chromaticity and the color will not be of the desired value. Suitable filter materials for inclusion in the phosphor composition to minimize tail portion c–d–g are inorganic color pigments including a cadmium sulphoselenide, red iron oxide of the Persian Gulf type, synthetic red iron oxide, "didymium" phosphate and similar rare earth insoluble compounds such as fluoride, all of which exhibit selectively high absorption for wavelengths less than 6000 Angstroms. Of course, mixtures of two or more pigments may be used to obtain results required in particular instances. These pigments are chemically inert, are thermally stable and are compatible with the phosphor materials listed above as suitable in practicing the subject invention. While the filter material could be placed as a separate lawyer on the screen side of the phosphor material as specifically described in the Kaplan patent, it is the preferred practice to form an intimate and uniform admixture of the phosphor and filter materials. The pigment material may also surround each phosphor grain as a thin overcoating or layer. It is convenient if the screening process of the above-identified application is followed to incorporate the filter material into the phosphor slurry.

The optimum cadmium content for the cadmium sulfide phosphor to attain the proper color is determined empirically because it is influenced, among other things, by the type and quantity of color pigment used as the filter material.

An ideal filter material would strongly attenuate the short wavelengths of radiation up to 6000 Angstroms and then exhibit no material attenuation in the desired range extending up to 7000 Angstroms. Of course, such an ideal characteristic is not easily attained but the desired result may be accomplished if the filter material of the red phosphor composition has high transmissivity or reflectivity in the red region and low transmissivity or reflectivity and in effect absorbs orange, yellow and green radiation. The effect of a filter material which has these transmission characteristics is to suppress the influence of the tail portion of c–d–g of the emission characteristic on chromaticity. The color attained then is similar to that of the previously employed unmodified zinc calmium sulfide of higher cadmium content but with the distinct advantage of a marked increase in luminous efficiency. The increased efficiency is attained because of the sensitivity of luminous efficiency to peak wavelengths of phosphors which, in turn, is due to two factors: the intrinsic increase in the output of the phosphor and the increased sensitivity of the eye to the phosphor light output.

By way of contrast with previous approaches in the composition of the red phosphor, curve B represents the emission characteristic of silver activated zinc cadmium sulfide phosphor used heretofor in the art. The shaded area under the curve extending from 7000 Angstroms to the higher wavelengths indicates the loss of efficiency resulting from a very significant part of the radiation falling in the infra-red range. The area under the curve commencing at 6000 Angstroms and extending in the shorter wavelength region is the tail portion, the presence of which requires the peak response to occur at approximately 6850 Angstroms in order to attain the desired red color. These difficulties are avoided with the new phosphor arrangement having the emission characteristic of curve A with a filter material to suppress the effect of the tail portion c–d–g. Experiments indicate that as between the prior approach and that of the present invention brightness gains in the amount of 30% are realizable for a desired red color. Moreover, a target including such a red phrosphor has a lower albedo which absorbs ambient light and increases the image contrast.

Figure 4:
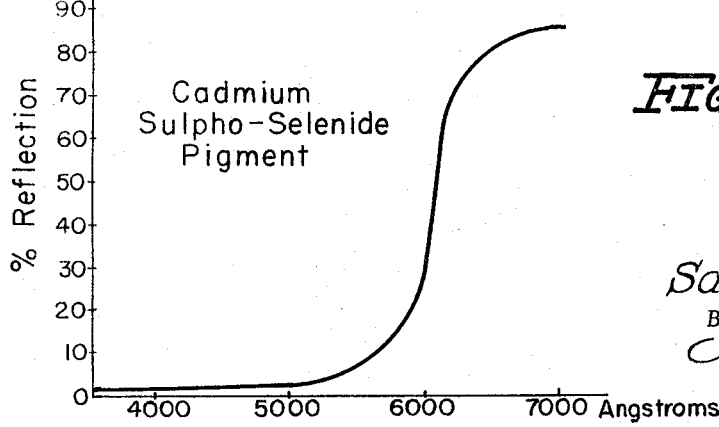

The curve of FIGURE 4 is the reflectance characteristic of cadmium sulpho-selenide pigment, a preferred filter material, which is seen to rise sharply at approximately 6000 Angstroms. This rise is the transition from high attenuation to relatively high transmissivity. The location of the absorption transition may be controlled by the selenium content of the pigment. Higher amounts of selenium produce a deeper red color.

For example, a silver activated zinc cadmium sulphide phosphor #4577, as manufactured by the U.S. Radium Corporation, Morristown, New Jersey, has a brightness of 13 ft.-Lamberts under specified conditions and a satisfactory color. A more orange red emitting silver activated zinc cadmium sulfide phosphor #4763, as made by the same company, has a brightness of 21 ft.-Lamberts under the same condition, but the color is considered unacceptable. When a mixture of 97.5% phosphor #4763 and 2.5% of cadmium sulpho-selenide red pigment #2010, as manufactured by the General Chemical Company, Newark, New Jersey is used, a brightness of 17 ft.-Lamberts under the same conditions is obtained and the final color is a richer red than that of the original #4577 phosphor, which yields only 13 ft.-Lamberts brightness. Thus, as mentioned in the above, in accordance with this invention, a 30% gain in the light output and at the same time a richer red color is obtained.

An added benefit of the described red phosphor composition concerns the exposure time of the screening process. It has been found that a shorter exposure time may be employed for the described phosphor composition in contrast with the exposure time for previously employed silver activated zinc cadmium sulfide phosphor materials.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A tri-color cathode-ray tube for producing an image in simulated natural color comprising: means for producing and projecting cathode-ray electrons; and an image screen disposed to be impinged upon by said electrons and formed of three related and interlaced patterns of color target elements each of which emits light of a respective one of red, blue and green colors in response to energization by said electrons, those of said target elements which emit said red color including a phosphor composition which consists essentially of a phosphor material having a desired radiation in response to energization by said electrons in the red portion of the visible spectrum within the range of 6000 to 7000 Angstroms with a peak output occurring at approximately 6300 Angstroms and further having an undesired radiation extending from approximately 6000 Angstroms into the shorter wavelength region, said red-color target elements further including a filter material which is absorptive of radiations having a wavelength extending from approximately 6000 Angstroms into said shorter wavelength region, which is highly transmissive of radiations within the range from 6000 to 7000 Angstroms, and which has a low reflectance at wavelengths of light corresponding to the radiation from those of said target elements which emit said blue and green colors to enhance the image contrast-ambient light characteristic of said image screen.

2. A tri-color cathode-ray tube, in accordance with claim 1, in which the chromaticity coordinates of said phosphor material are $x=0.64$ and $y=0.34$.

3. A tri-color cathode-ray tube, in accordance with claim 1, in which said filter material is substantially uniformly mixed with said phosphor material.

4. A tri-color cathode-ray tube, in accordance with claim 1, in which said phosphor material is a compound the metal ingredient of which is selected from a group consisting of zinc and cadmium, the non-metallic ingredient of which is selected from a group consisting of sulfides, selenides and tellurides, and activated by a metal selected from a group consisting of silver, copper and gold.

5. A tri-color cathode-ray tube, in accordance with claim 1, in which said filter material is selected from the group of pigments consisting of cadmium-sulpho-selenide, red iron oxide of the Persian Gulf type, and pure synthetic iron oxide.

6. A tri-color cathode-ray tube, in accordance with claim 1, in which said filter material is a layer surrounding and overcoated upon the individual grains of said phosphor material.

7. A tri-color cathode-ray tube, in accordance with claim 1, in which the radiation level from said phosphor material in the infra-red range at greater than 7000 Angstroms is substantially less than the level of said desired radiation.

References Cited by the Examiner

UNITED STATES PATENTS

| | | | |
|---|---|---|---|
| 2,088,595 | 8/1937 | Hartmann | 88—106 |
| 2,567,713 | 9/1951 | Kaplan | 178—7.86 X |
| 2,838,707 | 6/1958 | Schwing et al. | 252—301.3 X |
| 2,858,234 | 10/1958 | Ishler | 252—301.4 |
| 2,968,627 | 1/1961 | Wachtel | 252—301.6 |
| 3,010,909 | 11/1961 | Klasens et al. | 252—301.6 |
| 3,013,114 | 12/1961 | Bridges | 178—7.86 X |
| 3,024,381 | 3/1962 | Dalton et al. | 88—106 |
| 3,052,810 | 9/1962 | Mash | 313—108 |

OTHER REFERENCES

Leverenz: "Luminescence of Solids"; John Wiley and Sons Inc, New York, 1950 (QC475L4 in Scientific Library), Table No. 5 and page 234 cited.

JAMES W. LAWRENCE, *Primary Examiner.*

GEORGE N. WESTBY, DAVID J. GALVIN, R. SEGAL, *Assistant Examiners.*